US009394782B2

United States Patent
DiGiovanni et al.

(10) Patent No.: US 9,394,782 B2
(45) Date of Patent: Jul. 19, 2016

(54) APPARATUSES AND METHODS FOR AT-BIT RESISTIVITY MEASUREMENTS FOR AN EARTH-BORING DRILLING TOOL

(71) Applicant: Baker Hughes Incorporated, Houston, TX (US)

(72) Inventors: Anthony A. DiGiovanni, Houston, TX (US); Danny E. Scott, Montgomery, TX (US); Daniel T. Georgi, Houston, TX (US); David A. Curry, Buckinghamshire (GB); Rashid W. Khokhar, Sugar Land, TX (US); Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 536 days.

(21) Appl. No.: 13/839,821

(22) Filed: Mar. 15, 2013

(65) Prior Publication Data

US 2013/0270008 A1 Oct. 17, 2013

Related U.S. Application Data

(60) Provisional application No. 61/623,042, filed on Apr. 11, 2012.

(51) Int. Cl.
*E21B 47/01* (2012.01)
*E21B 47/00* (2012.01)
(Continued)

(52) U.S. Cl.
CPC . *E21B 47/01* (2013.01); *B22F 7/06* (2013.01); *C22C 26/00* (2013.01); *E21B 10/567* (2013.01); *E21B 47/00* (2013.01); *B22F 2005/001* (2013.01); *B22F 2005/005* (2013.01)

(58) Field of Classification Search
CPC ......... E21B 10/00; E21B 10/42; E21B 10/46; E21B 10/567; E21B 10/62; E21B 12/02; E21B 47/00; E21B 47/01; B22F 2005/001; B22F 2005/005
See application file for complete search history.

(56) References Cited

U.S. PATENT DOCUMENTS 4,268,276 A 5/1981 Bovenkerk
4,858,063 A 8/1989 Laue et al.
(Continued)

FOREIGN PATENT DOCUMENTS

WO 2011090481 A1 7/2011

OTHER PUBLICATIONS

Archie III: Electrical Conduction in Shaly Sands; Oct. 1989, Oilfield Review, vol. 1, Issue 3, pp. 43-53.*
(Continued)

*Primary Examiner* — Blake Michener
*Assistant Examiner* — Christopher Sebesta
(74) *Attorney, Agent, or Firm* — TraskBritt

(57) ABSTRACT

A cutting element for an earth-boring drilling tool comprises a cutting body having a cutting surface thereon, and a sensor coupled with the cutting surface, the sensor configured to determine resistivity of a contacting formation. An earth-boring drilling tool comprises a bit body and an instrumented cutting element coupled with the bit body. The cutting element includes a cutting body having a cutting surface thereon, and at least one sensor located proximate the cutting surface. The at least one sensor is oriented and configured to determine resistivity of a contacting formation. A method of determining resistivity of a subterranean formation during a drilling operation comprises energizing a sensor of an instrumented cutting element of a drill bit, sensing a return signal flowing on or through the subterranean formation through the instrumented cutting element, and determining a resistivity of the subterranean formation based, at least in part, on the return signal.

24 Claims, 9 Drawing Sheets

(51) Int. Cl.
*E21B 10/567* (2006.01)
*B22F 7/06* (2006.01)
*C22C 26/00* (2006.01)
*B22F 5/00* (2006.01)

(56) References Cited

U.S. PATENT DOCUMENTS

| | | | |
|---|---|---|---|
| 6,359,438 B1* | 3/2002 | Bittar | 324/369 |
| 6,850,068 B2 | 2/2005 | Chemali et al. | |
| 7,109,719 B2 | 9/2006 | Fabris et al. | |
| 7,256,582 B2 | 8/2007 | Gorek et al. | |
| 7,388,380 B2* | 6/2008 | Chen et al. | 324/347 |
| 7,407,566 B2* | 8/2008 | Jiang et al. | 204/400 |
| 7,697,375 B2 | 4/2010 | Reiderman et al. | |
| 7,946,357 B2 | 5/2011 | Trinh et al. | |
| 8,006,781 B2 | 8/2011 | Teodorescu et al. | |
| 8,203,344 B2 | 6/2012 | Gold et al. | |
| 2008/0011521 A1 | 1/2008 | Hall et al. | |
| 2008/0156534 A1* | 7/2008 | Clark | E21B 47/01 175/45 |
| 2008/0230280 A1 | 9/2008 | Keshavan et al. | |
| 2008/0257730 A1 | 10/2008 | Jiang et al. | |
| 2009/0205822 A1 | 8/2009 | DiFoggio et al. | |
| 2010/0051292 A1 | 3/2010 | Trinh et al. | |
| 2010/0282510 A1 | 11/2010 | Sullivan et al. | |
| 2010/0295548 A1 | 11/2010 | Georgi et al. | |
| 2011/0036641 A1 | 2/2011 | Lyons | |
| 2011/0057656 A1* | 3/2011 | Tchakarov et al. | 324/369 |
| 2011/0259642 A1 | 10/2011 | DiGiovanni et al. | |
| 2011/0266054 A1 | 11/2011 | Kumar et al. | |
| 2011/0266055 A1 | 11/2011 | DiGiovanni et al. | |
| 2011/0266058 A1 | 11/2011 | Kumar et al. | |
| 2012/0132468 A1 | 5/2012 | Scott et al. | |
| 2012/0152617 A1 | 6/2012 | Hunt et al. | |
| 2012/0152622 A1 | 6/2012 | Sue et al. | |
| 2012/0181900 A1 | 7/2012 | Puccio et al. | |
| 2012/0303347 A1 | 11/2012 | DiFoggio | |
| 2012/0312598 A1 | 12/2012 | Cheng | |
| 2012/0325564 A1* | 12/2012 | Vaughn et al. | 175/428 |
| 2013/0088364 A1 | 4/2013 | Bittar et al. | |
| 2013/0270007 A1 | 10/2013 | Scott et al. | |

OTHER PUBLICATIONS

Kong et al., A Theoretical Calculation of the Piezoresistivity and Magnetoresistivity in P-Type Semiconducting Diamond Films, Journal of Physics: Condensed Matter, vol. 14, pp. 1765-1774 (2002).
Scott et al, U.S. Appl. No. 13/586,668 entitled Apparatuses and Methods for Obtaining At-Bit Measurements for an Earth-Boring Drilling Tool, filed Aug. 15, 2012.
Scott et al, U.S. Appl. No. 13/586,650 entitled Methods for Forming Instrumented Cutting Elements of an Earth-Boring Drilling Tool, filed Aug. 15, 2012.
PCT International Search Report of the International Searching Authority for PCT/US2013/036151, dated Jul. 15, 2013, 4 pages.
PCT International Preliminary Report on Patentability and Written Opinion of the International Searching Authority for PCT/US2013/036151, dated Jul. 15, 2013, 10 pages.

* cited by examiner

APPARATUSES AND METHODS FOR AT-BIT RESISTIVITY MEASUREMENTS FOR AN EARTH-BORING DRILLING TOOL

CROSS-REFERENCE TO RELATED APPLICATIONS

This application claims the benefit of U.S. Provisional Patent Application Ser. No. 61/623,042, filed Apr. 11, 2012, and entitled "Apparatuses and Methods for At-Bit Resistivity Measurements for an Earth-Boring Drilling Tool," the disclosure of which is hereby incorporated herein in its entirety by this reference.

The subject matter of this application is also related to the subject matter of U.S. patent application Ser. No. 13/586,668, filed Aug. 15, 2012, now U.S. Pat. No. 9,212,546, issued Dec. 15, 2015, and entitled "Apparatuses and Methods for Obtaining At-Bit Measurements for an Earth-Boring Drilling Tool," and U.S. patent application Ser. No. 13/586,650, filed Aug. 12, 2012, and entitled, "Methods for Forming Instrumented Cutting Elements of an Earth-Boring Drilling Tool," the disclosure of each which is incorporated herein by this reference in its entirety.

TECHNICAL FIELD

The present disclosure generally relates to earth-boring drill bits, cutting elements attached thereto, and other tools that may be used to drill subterranean formations. More particularly, embodiments of the present disclosure relate to obtaining at-bit resistivity measurements from an earth-boring drill bit during drilling.

BACKGROUND

The oil and gas industry expends sizable sums to design cutting tools, such as downhole drill bits including roller cone rock bits and fixed-cutter bits. Such drill bits may have relatively long service lives with relatively infrequent failure. In particular, considerable sums are expended to design and manufacture roller cone rock bits and fixed-cutter bits in a manner that minimizes the probability of catastrophic drill bit failure during drilling operations. The loss of a roller cone or a polycrystalline diamond compact from a bit during drilling operations can impede the drilling operations and, at worst, necessitate rather expensive fishing operations.

Diagnostic information related to a drill bit and certain components of the drill bit may be linked to the durability, performance, and the potential failure of the drill bit. In addition, characteristic information regarding the rock formation may be used to estimate performance and other features related to drilling operations. Logging while drilling (LWD), measuring while drilling (MWD), and front-end measurement device (FEMD) measurements are conventionally obtained from measurements behind the drill head, such as at several feet away from the cutting interface. As a result, errors and delay may be introduced into the data, which may result in missed pay-zones, delays in getting information, and drilling parameters that are not sufficiently optimized.

SUMMARY

Embodiments of the present disclosure include a cutting element for an earth-boring drilling tool. The cutting element comprises a cutting element body having a cutting surface thereon, and at least one sensor located proximate the cutting surface. The at least one sensor is oriented and configured to determine resistivity of a contacting formation.

Another embodiment includes an earth-boring drilling tool. The earth-boring drilling tool comprises a bit body and an instrumented cutting element coupled with the bit body. The cutting element includes a substrate with a cutting surface thereon, and at least one sensor located proximate the cutting surface. The at least one sensor is oriented and configured to determine resistivity of a contacting formation.

Another embodiment includes a method of determining resistivity of a subterranean formation during a drilling operation. The method comprises energizing a sensor of an instrumented cutting element of a drill bit, sensing a return signal flowing on or through the subterranean formation, and determining a resistivity of the subterranean formation based, at least in part, on the return signal.

DETAILED DESCRIPTION

Figure 1:
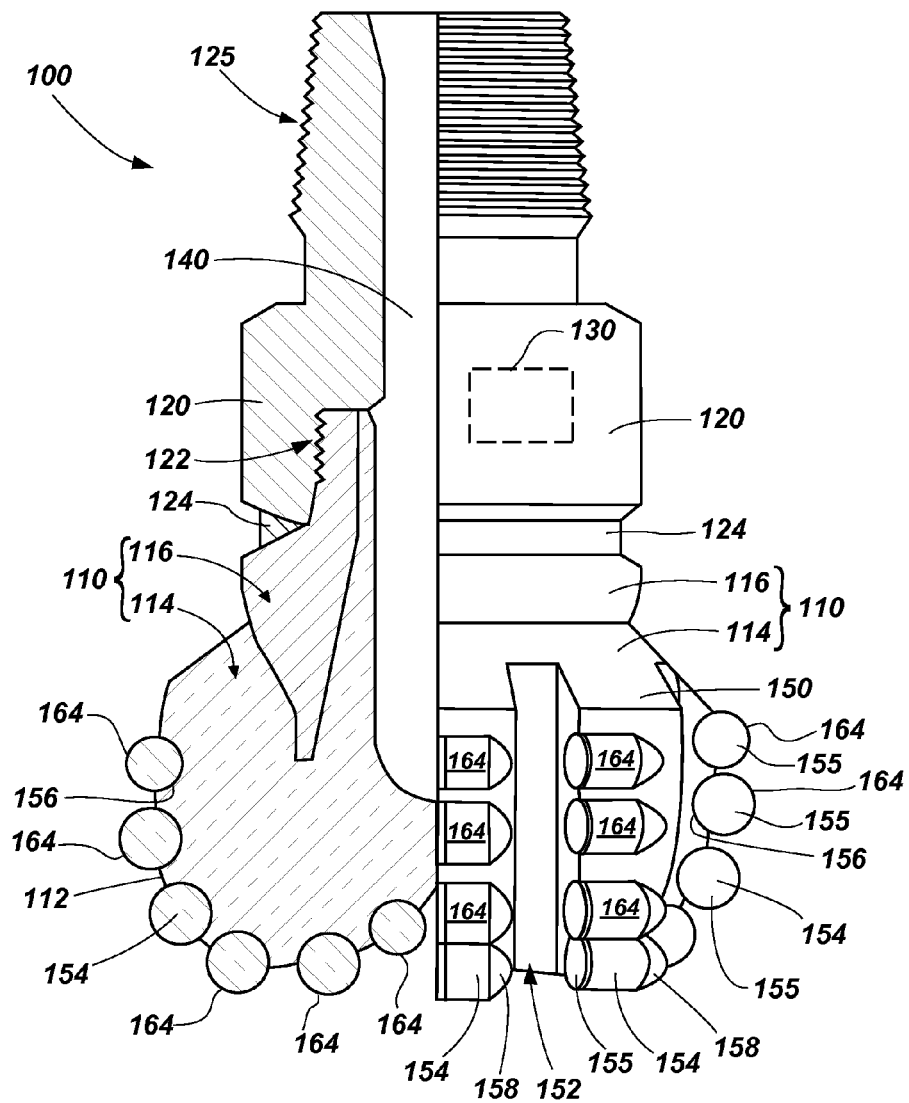
FIG. 1 illustrates a cross-sectional view of an exemplary earth-boring drill bit.

In the following detailed description, reference is made to the accompanying drawings that form a part hereof and, in which are shown by way of illustration, specific embodiments in which the disclosure may be practiced. These embodiments are described in sufficient detail to enable those of ordinary skill in the art to practice the disclosure, and it is to be understood that other embodiments may be utilized, and that structural, logical, and electrical changes may be made within the scope of the disclosure.

Referring in general to the following description and accompanying drawings, various embodiments of the present disclosure are illustrated to show its structure and method of operation. Common elements of the illustrated embodiments may be designated with the same or similar reference numerals. It should be understood that the figures presented are not meant to be illustrative of actual views of any particular portion of the actual structure or method, but are merely idealized representations employed to more clearly and fully depict the present disclosure defined by the claims below. The illustrated figures may not be drawn to scale.

As used herein, a "drill bit" means and includes any type of bit or tool used for drilling during the formation or enlargement of a well bore hole in subterranean formations and includes, for example, fixed cutter bits, rotary drill bits, percussion bits, core bits, eccentric bits, bi-center bits, reamers, mills, drag bits, roller cone bits, hybrid bits and other drilling bits and tools known in the art.

As used herein, the term "polycrystalline material" means and includes any material comprising a plurality of grains or crystals of the material that are bonded directly together by inter-granular bonds. The crystal structures of the individual grains of the material may be randomly oriented in space within the polycrystalline material.

As used herein, the term "polycrystalline compact" means and includes any structure comprising a polycrystalline material formed by a process that involves application of pressure (e.g., compaction) to the precursor material or materials used to form the polycrystalline material.

As used herein, the term "hard material" means and includes any material having a Knoop hardness value of about 3,000 Kgf/mm$^2$ (29,420 MPa) or more. Hard materials include, for example, diamond and cubic boron nitride.

FIG. 1 is a cross-sectional view of an earth-boring drill bit 100, which may implement embodiments of the present disclosure. The earth-boring drill bit 100 includes a bit body 110. The bit body 110 of the earth-boring drill bit 100 may be formed from steel. In some embodiments, the bit body 110 may be formed from a particle-matrix composite material. For example, the bit body 110 may further include a crown 114 and a steel blank 116. The steel blank 116 is partially embedded in the crown 114. The crown 114 may include a particle-matrix composite material such as, for example, particles of tungsten carbide embedded in a copper alloy matrix material. The bit body 110 may be secured to the shank 120 by way of a threaded connection 122 and a weld 124 extending around the earth-boring drill bit 100 on an exterior surface thereof along an interface between the bit body 110 and the shank 120. Other methods are contemplated for securing the bit body 110 to the shank 120.

The earth-boring drill bit 100 may include a plurality of cutting elements 154, 164 attached to the face 112 of the bit body 110. The earth-boring drill bit 100 may include at least one instrumented cutting element 154 that is instrumented with a sensor configured to obtain real-time data related to the performance of the instrumented cutting element 154 and/or characteristics of the rock formation, such as resistivity measurements. The instrumented cutting elements 154 may be operably coupled with control circuitry 130 that is configured to measure voltage and/or current signals from the sensors. The control circuitry 130 may also include a power supply (e.g., voltage source or current source) that is used to energize the sensors for performing the measurements. The control circuitry 130 may also include an oscillator to generate the current flowing through the subterranean formation at a desired frequency. The control circuitry 130 may be integrated within the earth-boring drill bit 100 itself.

In some embodiments, the earth-boring drill bit 100 may also include non-instrumented cutting elements 164 that are not be instrumented with a sensor. Of course, it is also contemplated that embodiments of the present disclosure include an earth-boring drill bit 100 having all cutting elements being instrumented cutting elements 154. Generally, the cutting elements 154, 164 of a fixed-cutter type drill bit have either a disk shape or a substantially cylindrical shape. The cutting elements 154, 164 include a cutting surface 155 located on a substantially circular end surface of the cutting element 154, 164. The cutting surface 155 may be formed by disposing a hard, super-abrasive material, such as mutually bound particles of polycrystalline diamond formed into a "diamond table" under high temperature, high pressure (HTHP) conditions, on a supporting substrate. The diamond table may be formed onto the substrate during the HTHP process, or may be bonded to the substrate thereafter. Such cutting elements 154, 164 are often referred to as a polycrystalline compact or a polycrystalline diamond compact (PDC) cutting element 154, 164. The cutting elements 154, 164 may be provided along blades 150, and within pockets 156 formed in the face 112 of the bit body 110, and may be supported from behind by buttresses 158 that may be integrally formed with the crown 114 of the bit body 110. The cutting elements 154, 164 may be fabricated separately from the bit body 110 and secured within the pockets 156 formed in the outer surface of the bit body 110. If the cutting elements 154, 164 are formed separately from the bit body 110, a bonding material (e.g., adhesive, braze alloy, etc.) may be used to secure the cutting elements 154 to the bit body 110. In some embodiments, it may not be desirable to secure the instrumented cutting elements 154 to the bit body 110 by brazing because the sensors 216 (FIG. 2) may not be able to withstand the thermal braze procedures. As a result, another bonding process may be performed (e.g., using adhesives).

The bit body 110 may further include junk slots 152 that separate the blades 150. Internal fluid passageways (not shown) extend between the face 112 of the bit body 110 and a longitudinal bore 140, which extends through the shank 120 and partially through the bit body 110. Nozzle inserts (not shown) also may be provided at the face 112 of the bit body 110 within the internal fluid passageways.

The earth-boring drill bit 100 may be secured to the end of a drill string (not shown), which may include tubular pipe and equipment segments (e.g., drill collars, a motor, a steering tool, stabilizers, etc.) coupled end to end between the earth-boring drill bit 100 and other drilling equipment at the surface of the formation to be drilled. As one example, the earth-boring drill bit 100 may be secured to the drill string, with the bit body 110 being secured to the shank 120 having a threaded connection portion 125 and engaging with a threaded connection portion of the drill string. An example of such a threaded connection portion is an American Petroleum Institute (API) threaded connection portion.

During drilling operations, the earth-boring drill bit 100 is positioned at the bottom of a well bore hole such that the cutting elements 154 are adjacent the earth formation to be drilled. Equipment such as a rotary table or a top drive may be used for rotating the drill string and the drill bit 100 within the bore hole. Alternatively, the shank 120 of the earth-boring drill bit 100 may be coupled to the drive shaft of a down-hole motor, which may be used to rotate the earth-boring drill bit 100. As the earth-boring drill bit 100 is rotated, drilling fluid is pumped to the face 112 of the bit body 110 through the longitudinal bore 140 and the internal fluid passageways (not shown). Rotation of the earth-boring drill bit 100 causes the cutting elements 154, 164 to scrape across and shear away the surface of the underlying formation. The formation cuttings mix with, and are suspended within, the drilling fluid and pass through the junk slots 152 and the annular space between the well bore hole and the drill string to the surface of the earth formation.

When the cutting elements 154, 164 scrape across and shear away the surface of the subterranean formation, a significant amount of heat and mechanical stress may be generated. Components of the earth-boring drill bit 100 (e.g., the instrumented cutting elements 154) may be configured for detection of performance and/or formation data (e.g., resistivity measurements) during drilling operations, as will be discussed herein with respect to FIGS. 2 through 14. For example, resistivity measurements may be indicative of hardness of the rock formation. In some embodiments, the real-time data may include porosity determinations. Diagnostic information related to the actual performance of the earth-boring drill bit 100 and characteristics of the subterranean formation may be obtained through analysis of the data signals generated by the sensors.

In some embodiments of the present disclosure, one or more instrumented cutting elements 154 of the earth-boring drill bit 100 may include a voltage sensor and/or a current sensor associated therewith that is configured to provide such data. Although the instrumented cutting elements 154 are illustrated and described herein as examples, embodiments of the present disclosure may include other components within the earth-boring drill bit 100 being configured for obtaining diagnostic information related to the performance of the earth-boring drill bit 100 or characteristics of the subterranean formation.

In addition, the instrumented cutting elements 154 may be used as a first line of detection within the subterranean formation, while additional instrumented components of the earth-boring drill bit 100 may perform secondary detection of performance data. In addition, calibrating resistivity measurements by the instrumented cutting elements 154 during drilling may enable correlating wear condition, active depth of cut control, understanding the extent of formation engagement while drilling, pad-type formation resistivity measurements, and/or identifying where in the earth-boring drill bit 100 instabilities may originate. As a result, active bit control may be enabled. As will be described below, at-bit resistivity measurements may be obtained from one or more instrumented cutting elements 154, such as from a plurality of instrumented cutting elements 154 positioned at various locations on the earth-boring drill bit 100. In some embodiments, the instrumented cutting elements 154 may be positioned in non-cutting orientations and locations for the purpose of enhancing measurements and/or providing redundancy. For example, at least one instrumented cutting element may be positioned in a location that is coupled with an element of the drill string that is different than the bit body 110. In another embodiment, at least one instrumented cutting element may be positioned at a location that is at or near the surface of the formation. Such an instrumented cutting element 154 may have sensors 216 (FIG. 2) that are coupled with electrical conductors in the drill string and the bit body 110.

In another embodiment, another element of an earth-boring drill bit 100 may be instrumented in a similar manner to the examples described herein regarding instrumented cutting elements 154. For example, an instrumented element may be instrumented and coupled with the drill bit such that the instrumented element may not be a cutter, but may actively engage the subterranean formation 201 in a dragging or rubbing mode. Similar to the embodiments including the instrumented cutting element 154, such an instrumented element may include a sensor 216 that may be formed during the HTHP sintering process. In addition, the sensor 216 may include a doped diamond material or other conductive material.

Various instrumented cutting elements 154 described herein may further be manufactured with varying resistivity by doping with Boron or other selected elements. For example, diamond cutting elements may exhibit properties of a conductor rather than an insulator depending on the dopant.

Figure 2:
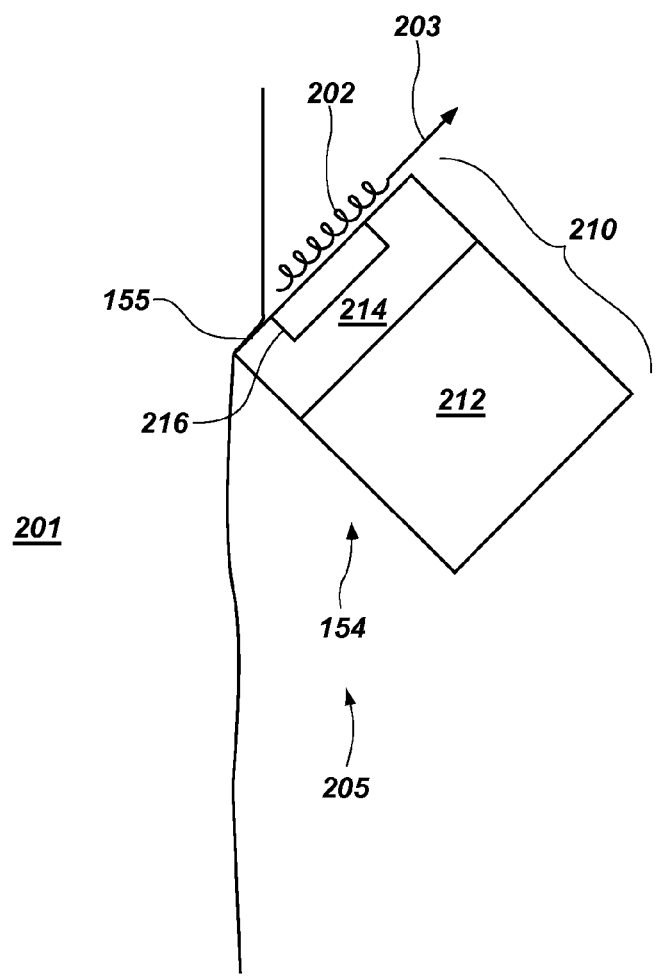
FIG. 2 shows a cutting element of FIG. 1 engaging with a subterranean formation.

FIG. 2 is a simplified and schematically illustrated drawing of an instrumented cutting element 154 of FIG. 1 engaging a subterranean formation 201 within a well bore hole 205. For simplicity, the instrumented cutting element 154 is shown separately without showing detail for the associated earth-boring drill bit. The instrumented cutting element 154 may have a cutting element body having a cutting surface 155 thereon. The cutting element body may be configured as a PDC compact 210 that includes a substrate 212 coupled with a diamond table 214 having a cutting surface 155. In some embodiments, the cutting element body may not have a substrate. In some embodiments, the instrumented cutting element 154 may have a generally cylindrical shape. In other embodiments, the instrumented cutting elements 154 may have other shapes, such as conical, brutes, ovoids, etc.

The instrumented cutting element 154 further includes a sensor 216. The sensor 216 may be coupled with the diamond table 214. As an example, the sensor 216 may be disposed within the diamond table 214, such as being embedded or at least partially formed within the diamond table 214. As a result, the sensor 216 may be located at or near the cutting surface 155 of the instrumented cutting element 154. The sensor 216 may function as an electrode that may be energized to generate a current flowing through the subterranean formation 201. The sensor 216 may be configured to measure voltage and/or a current used to determine a resistivity of the subterranean formation 201 in contact with the sensor 216. In some embodiments, the control circuitry 130 may include a voltage source that applies a fixed voltage to the sensor 216, and the current value from the return signal may be sensed and used to determine the resistivity of the subterranean formation 201. In some embodiments, the control circuitry 130 may include a current source that injects a fixed current to the sensor 216 and the voltage across the electrodes of the sensor 216 may be sensed and used to determine the resistivity of the subterranean formation 201. In some embodiments, sensors 216 having both current and voltage electrodes may be employed.

In some embodiments, the sensor 216 may be formed during the HTHP sintering process used to form the instrumented cutting element 154. The HTHP process may include sintering diamond powder used to form the diamond table 214 of the instrumented cutting element 154 at a temperature of at least 1300° Celsius and a pressure of at least 5.0 GPa. In some embodiments, the diamond table 214 may be formed separately as a standalone object (e.g., a free standing diamond table) to facilitate the addition of the sensor 216, and the diamond table 214 may be attached to the substrate 212. For example, the sensor 216 may be formed with the instrumented cutting element 154 according to one or more of the methods described in U.S. patent application Ser. No. 13/586,650, filed Aug. 12, 2012, and entitled, "Methods for Forming Instrumented Cutting Elements of an Earth-Boring Drilling Tool," the disclosure of which is incorporated herein by this reference in its entirety.

As an example, the sensor 216 described herein may be formed by doping a portion of the polycrystalline diamond material, such as boron, phosphorous, sulfur, or other materials that are either shallow electron donors or electron acceptors capable of inducing significant charge carrier densities at temperatures below, for example, 600° C. By doping selected portions or regions of the polycrystalline diamond material, the conductivity of the doped portion of the polycrystalline diamond material may be increased relative to the remainder of the polycrystalline diamond material. Metal solvent catalyst, which may be present in the interstitial spaces between the inter-bonded diamond grains in the polycrystalline diamond table may be removed from the polycrystalline diamond table proximate the doped portions (e.g., surrounding the doped portions) to decrease the conductivity of those regions relative to the conductivity of the doped regions. As a result, the doped portions of the diamond material of the instrumented cutting elements 154 may exhibit properties of an electrical conductor, and the surrounding other regions of the diamond material of the instrumented cutting elements 154 may exhibit properties of an electrical insulator. Additional details of materials that may be used to form the sensor 216 is described in U.S. patent application Ser. No. 13/586,668, filed Aug. 15, 2012, and entitled "Apparatuses and Methods for Obtaining At-Bit Measurements for an Earth-Boring Drilling Tool," the disclosure of which is incorporated by this reference in its entirety.

While in operation, the instrumented cutting element 154 may scrape across and shear away the surface of the subterranean formation 201. Cuttings 202 from the subterranean formation 201 may pass across the sensor 216 as indicated by arrow 203. In some embodiments, the sensor 216 may be configured to generate an electrical signal used to measure resistivity of the subterranean formation 201. For example, the sensor 216 may be energized, causing current to flow through the subterranean formation 201 and/or the cuttings 202 in contact with the energized sensor 216. As a result, resistivity measurements may be taken from a measured voltage and/or current detected by the sensor 216, which may be aided by intimate contact of the sensor 216 with the subterranean formation 201 for current to flow from the instrumented cutting element 154. As will be discussed in more detail below, a plurality of instrumented cutting elements 154 may function as electrodes such that current flowing through the subterranean formation 201 between the instrumented cutting elements 154 may be measured. In some embodiments, an individual instrumented cutting element 154 may include individual electrodes such that current flowing through the subterranean formation 201 in contact with the individual electrodes of an individual instrumented cutting element 154 may be measured.

In some embodiments, the sensor 216 may be configured as a piezoresistive sensor. For example, during drilling operations, the sensor 216 may be positioned with the instrumented cutting element 154 such that energizing the sensor 216 may measure the resistivity of the instrumented cutting element 154 itself. In addition, using the resisitivity measurement of the instrumented cutting element 154, the pressure of the instrumented cutting element 154 may be estimated. The sensor 216 may be formed from a piezoresistive material (e.g., diamond), which may further be doped (e.g., with boron, lithium, nitrogen, etc.) to obtain a sufficient piezoresistivity. In some embodiments, the piezoresistive material may be undoped (e.g., pure single crystal diamond).

In addition, at-bit resistivity measurements may be used in conjunction with other sensor components in the borehole assembly, such as thermocouples, thermistors, chemical sensors, acoustic transducers, gamma detectors, dielectric sensors, etc. Acoustic transducers may include time-of-flight measurements to detect wear of the instrumented cutting elements 154. Wear of the instrumented cutting element 154 may also be determined through electrical measurements. Examples of such other related sensors may be described in U.S. Patent Application Publication No. 2011/0266058, filed Apr. 25, 2011, and entitled "PDC Sensing Element Fabrication Process and Tool," U.S. Patent Application Publication No. 2011/0266054, filed Apr. 25, 2011, and entitled "At-Bit Evaluation of Formation Parameters and Drilling Parameters," U.S. Patent Application Publication No. 2011/0266055, filed Apr. 25, 2011, and entitled "Apparatus and Methods for Detecting Performance Data in an Earth-Boring Drilling Tool," and U.S. Patent Application Publication No. 2012/0312598, filed Jun. 13, 2011, and entitled "Apparatuses and Methods for Determining Temperature Data of a Component of an Earth-Boring Drilling Tool," the disclosure of each of the foregoing applications being incorporated herein by this reference in its entirety.

Figure 3:
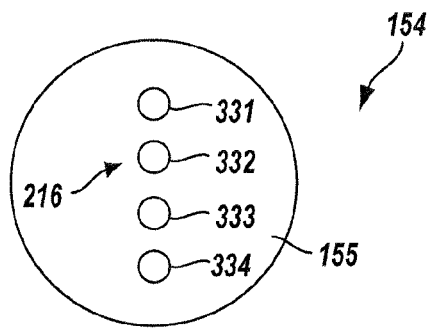
FIG. 3 shows a front view of the cutting element of FIG. 1 according to an embodiment of the present disclosure.

FIG. 3 shows a front view of the instrumented cutting element 154 of FIG. 1 according to an embodiment of the present disclosure. The front view of FIG. 3 shows the cutting surface 155 and the sensor 216. In FIG. 3, the sensor 216 may include a plurality of discrete electrodes 331, 332, 333, 334. As shown in FIG. 3, the discrete electrodes 331, 332, 333, 334 may be linearly aligned. In some embodiments, the linearly aligned discrete electrodes 331, 332, 333, 334 may be parallel to the borehole axis. In some embodiments, the linearly aligned discrete electrodes 331, 332, 333, 334 may be orthogonal to the borehole axis.

The discrete electrodes 331, 332, 333, 334 may be configured as a four-terminal electrode configuration for resistivity measurement. For example, a first electrode 331 and a fourth electrode 334 may be used by a control circuitry 130 (FIG. 1) to measure voltage, and a second electrode 332 and a third electrode 333 may be used to measure current. Other combinations of voltage and current measurements are also contemplated. The control circuitry 130 may be configured to operate electrode pairs (electrodes 331, 334 and electrodes 332, 333) simultaneously or alternatingly.

As an example, a current source from the control circuitry 130 may be coupled with the first electrode 331 and the fourth electrode 334 to inject a current (e.g., as a pulse) into the subterranean formation 201. The current signal may be injected into the subterranean formation 201 through the first electrode 331 using the fourth electrode 334 as the current return to the control circuitry 130. The voltage across the first electrode 331 and the fourth electrode 334 may be sensed and measured. A voltage source from the control circuitry 130 may be coupled with the second electrode 332 and the third electrode 333 such that a fixed voltage differential may be applied (e.g., as a pulse) across the second electrode 332 and the third electrode 333. The fixed voltage differential may be large enough such that a detectable amount of current may flow through the subterranean formation 201, and the generated current may be returned to the control circuitry 130 to be sensed and measured. As a result, the resistivity may be determined based on the measurements of the voltage and/or current.

Figure 4:
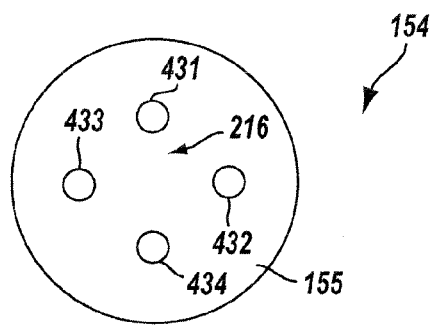
FIG. 4 shows a front view of the cutting element of FIG. 1 according to another embodiment of the present disclosure.
Figure 5:
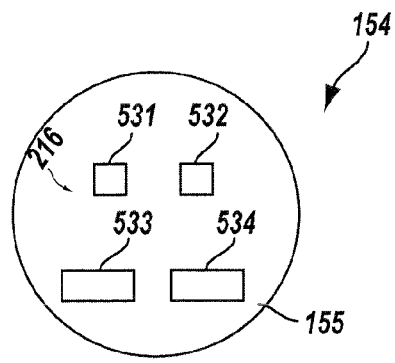
FIG. 5 shows a front view of the cutting element of FIG. 1 according to another embodiment of the present disclosure.

FIG. 4 shows a front view of the instrumented cutting element 154 of FIG. 1 according to another embodiment of the present disclosure. In FIG. 4, the sensor 216 may include a plurality of discrete electrodes 431, 432, 433, 434 that are arranged in a non-linear pattern. The first electrode 431 and the second electrode 432 may be used to measure voltage, while the third electrode 433 and the fourth electrode 434 may be used to measure current in a similar manner as discussed above.

In addition, FIGS. 3 and 4 show electrodes that are circular shaped; however, other sensor shapes are contemplated. For example, in FIG. 5 the first electrode 531 and the second electrode 532 are shown as being square shaped, and the third electrode 533 and the fourth electrode 534 are shown as being rectangular shaped. Other shapes, such as triangles, ovals, spirals, etc., are contemplated, including combinations of shapes. The electrodes 531, 532, 533, 534 may be configured as four terminal electrodes to measure a voltage and a current of the contacting subterranean formation 201. In addition, some embodiments may include only a pair of electrodes on the instrumented cutting element 154. In addition, any of the electrodes in FIGS. 3 through 5 may comprise an array of electrodes, which may provide separate measurements to increase accuracy and/or redundancy in the event of failure of one or more of the electrodes of the array.

In some embodiments, the instrumented cutting element 154 having a four electrode configuration (see, e.g., FIGS. 3 through 5) may be coupled with the control circuitry 130 such that the instrumented cutting element 154 may operate as a three electrode device, in which one of the electrodes may either not be coupled to the control circuitry 130 or that the control circuitry 130 may be coupled. Of course, in some embodiments, the instrumented cutting element 154 may include only three electrodes that are arranged and coupled with the control circuitry 130 as a three electrode device.

Figure 6:
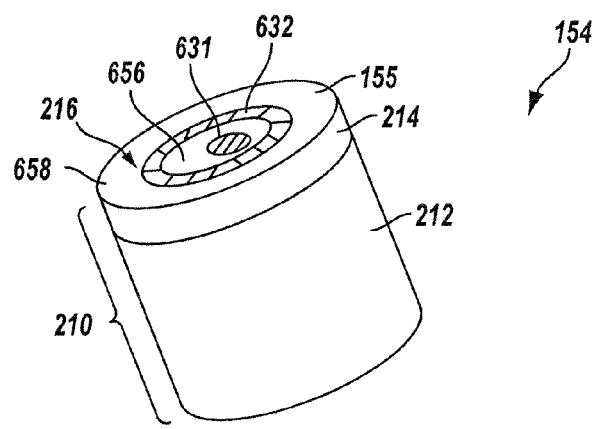
FIG. 6 shows a perspective view of the cutting element of FIG. 1 according to another embodiment of the present disclosure.
Figure 7:
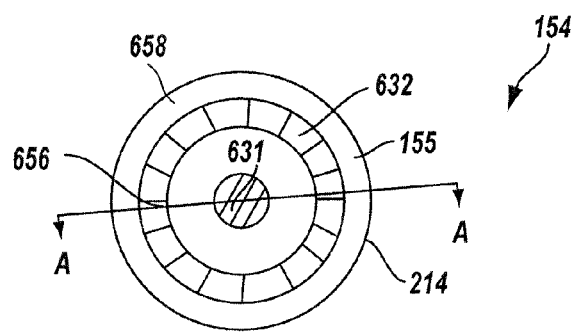
FIG. 7 shows a front view of the cutting element of FIG. 6.

FIG. 6 shows a perspective view of the instrumented cutting element 154 of FIG. 1 according to another embodiment of the present disclosure. FIG. 7 shows a front view of the instrumented cutting element 154 of FIG. 6. In FIGS. 6 and 7, the sensor 216 may include a plurality of electrodes 631, 632 that includes an outer electrode 632 extending around an inner electrode 631, which may be used to measure a voltage and/or a current of the contacting rock formation. The outer electrode 632 may be shaped as a ring, but other shapes are also contemplated. In some embodiments, the inner electrode 631 may be configured as a circle, square, or other shape having a solid center region rather than having a ring shape.

Figure 8:
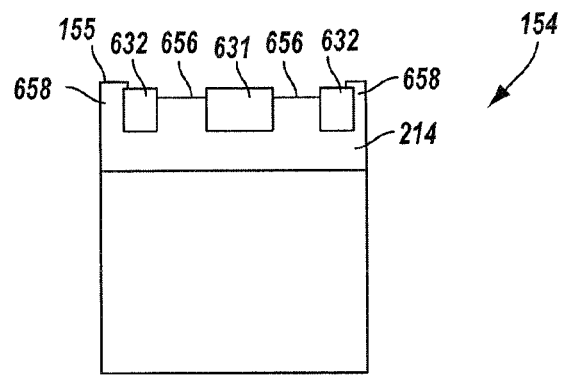
FIG. 8 is a cross-section of the instrumented cutting element taken along the line A-A of FIG. 7.

FIG. 8 is a cross-section of the instrumented cutting element 154 taken along the line A-A of FIG. 7. In some embodiments, the elements along the cutting surface 155 may be co-planar. As is shown in FIG. 8, however, some embodiments may include elements that are not co-planar. In particular, an outer region 658 around the periphery of the cutting surface 155 may be a protruding region that protrudes beyond the first electrode 631. As a result, the outer region 658 may experience a greater amount of stress and wear than the electrodes 631, 632, which may protect the electrodes 631, 632 and prolong their operability. In addition, an inner region 656 (e.g., the region between the electrodes 631, 632) of the cutting surface 155 may be a recessed region. The recessed region 656 may enable the cuttings 202 (FIG. 2) to come away more easily from the side of the subterranean formation 201. In addition, the cuttings 202 may become compacted within the recessed region 656 such that the electrical connection may be greater between the first electrode 631 and the second electrode 632 during current flow, which may result in a more accurate reading of the voltage and/or current.

Figure 9:
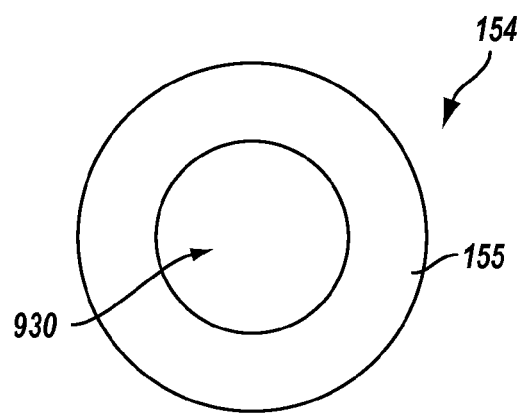
FIG. 9 shows a front view of the cutting element of FIG. 1 according to another embodiment of the present disclosure.
Figure 10:
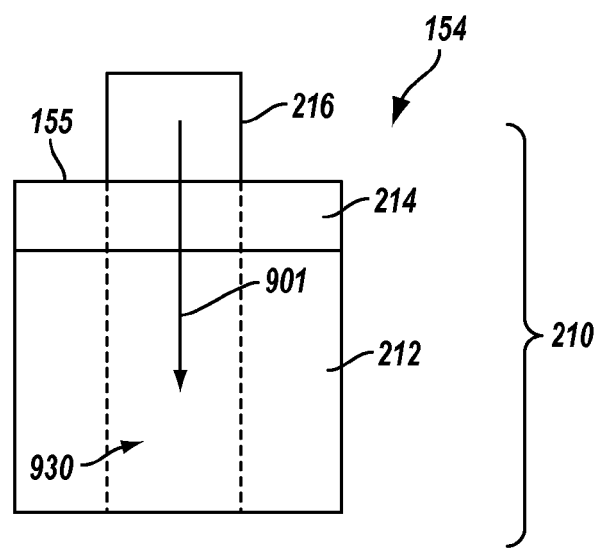
FIG. 10 shows a side view of the cutting element of FIG. 8 having a sensor inserted therein.

FIG. 9 shows a front view of the instrumented cutting element 154 of FIG. 1 according to another embodiment of the present disclosure. The instrumented cutting element 154 may include an aperture 930 formed therethrough, such that the instrumented cutting element 154 has a hollow core. The aperture 930 may be formed in the instrumented cutting element 154 during formation of the instrumented cutting element 154, such as during the HTHP process forming the instrumented cutting element 154. In some embodiments, the aperture 930 may be formed after HTHP, such as by drilling the aperture 930 from a cutting element that has been already formed. As shown in FIG. 10, the sensor 216 may be inserted within the aperture 930 as indicated by arrow 901.

Figure 11:
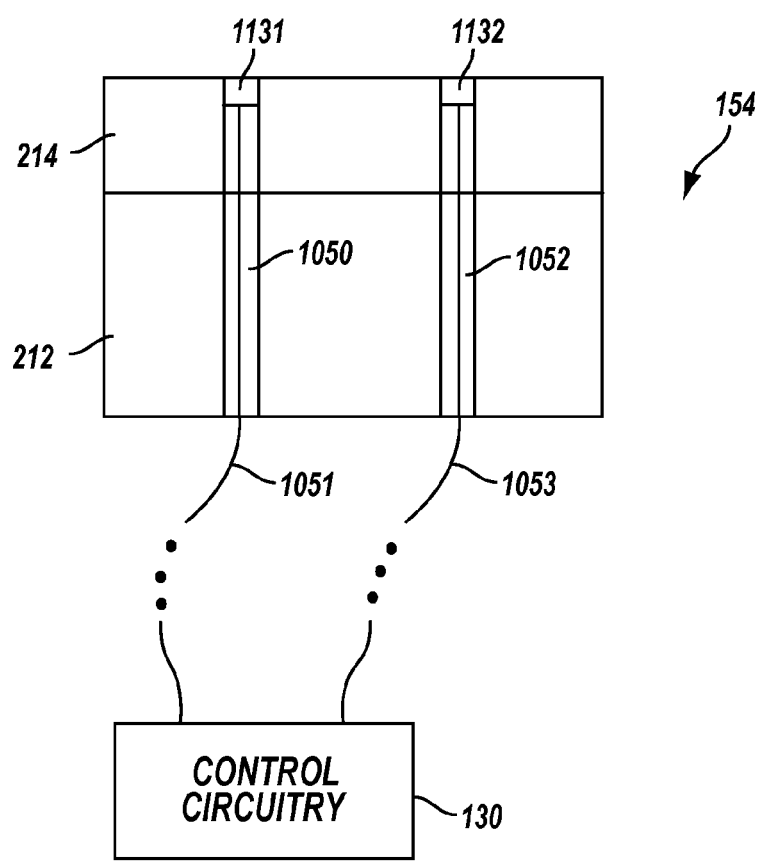
FIG. 11 is a cross-section of an instrumented cutting element according to an embodiment of the present disclosure.

FIG. 11 is a cross-section of an instrumented cutting element 154 according to an embodiment of the present disclosure. In particular, FIG. 11 shows a configuration for the instrumented cutting element 154 coupling with the control circuitry 130. The instrumented cutting element 154 may include electrodes 1131, 1132 coupled with conduits 1050, 1052 that extend through the substrate 212 and the diamond table 214. The conduits 1050, 1052 may be formed to at least partially align with the electrodes 1131, 1132. The conduits 1050, 1052 may respectively include electrical conductors 1051, 1053 that couple with the electrodes 1131, 1132. In some embodiments, the electrical conductors 1051, 1053 may be surrounded by a dielectric material (e.g., a ceramic sheath) to electrically isolate the electrical conductors 1051, 1053 from the substrate 212. In some embodiments, the electrical conductors 1051, 1053 may be formed from the same material as the electrodes 1131, 1132 (e.g., a doped diamond material).

The instrumented cutting element 154 may be attached to the earth-boring drill bit 100 (FIG. 1) by brazing the instrumented cutting element 154 within the pocket 156 of the bit body 110, as previously described. The bit body 110 may include wiring for coupling with the electrical conductors 1051, 1053 through the back of the pocket 156 in order to further transmit the electrical signal to the control circuitry 130 and/or receive a voltage from a power source of the control circuitry 130.

Embodiments of the present disclosure include the earth-boring drill bits 100 that include at least one instrumented cutting element 154 that is instrumented with a sensor 216 that is configured according to one or more of the embodiments described herein. The earth-boring drill bit 100 may further include a plurality of cutting elements 164, which may be simple cutting elements that are not instrumented with the sensors described herein. Thus, the earth-boring drill bit 100 may include as few as a single instrumented cutting element 154 that is instrumented and configured according to one or more of the embodiments described herein. For example, the instrumented cutting element 154 may include a sensor 216 that may be configured as described above with respect to FIGS. 2 through 11. Thus, in some embodiments the instrumented cutting element 154 may include a sensor 216 configured as a multiple terminal device. In some embodiments, the instrumented cutting element 154 may include a sensor 216 configured as a single terminal device. For embodiments with a plurality of instrumented cutting elements 154, the plurality of current paths within the earth-boring drill bit 100 may be isolated appropriately in order to reduce noise and generate a detectable signal.

In addition, the instrumented cutting elements 154 may be separate electrodes that are electrically isolated from the rest of the earth-boring drill bit 100. As a result, a plurality of instrumented cutting elements 154 may be connected as an array to achieve different depths of investigations (e.g., ranges between 0.5 in. and 3 in.). In some embodiments, the entire bit body 110 may be energized with the return path for the current being at a location up the drill string. As a result, larger currents and deeper imaging may be achieved. For electrodes within a single instrumented cutting element 154 having a conductive/non-conductive pattern, the depth of investigation may be relatively shallow (e.g., less than 2 mm).

Figure 12:
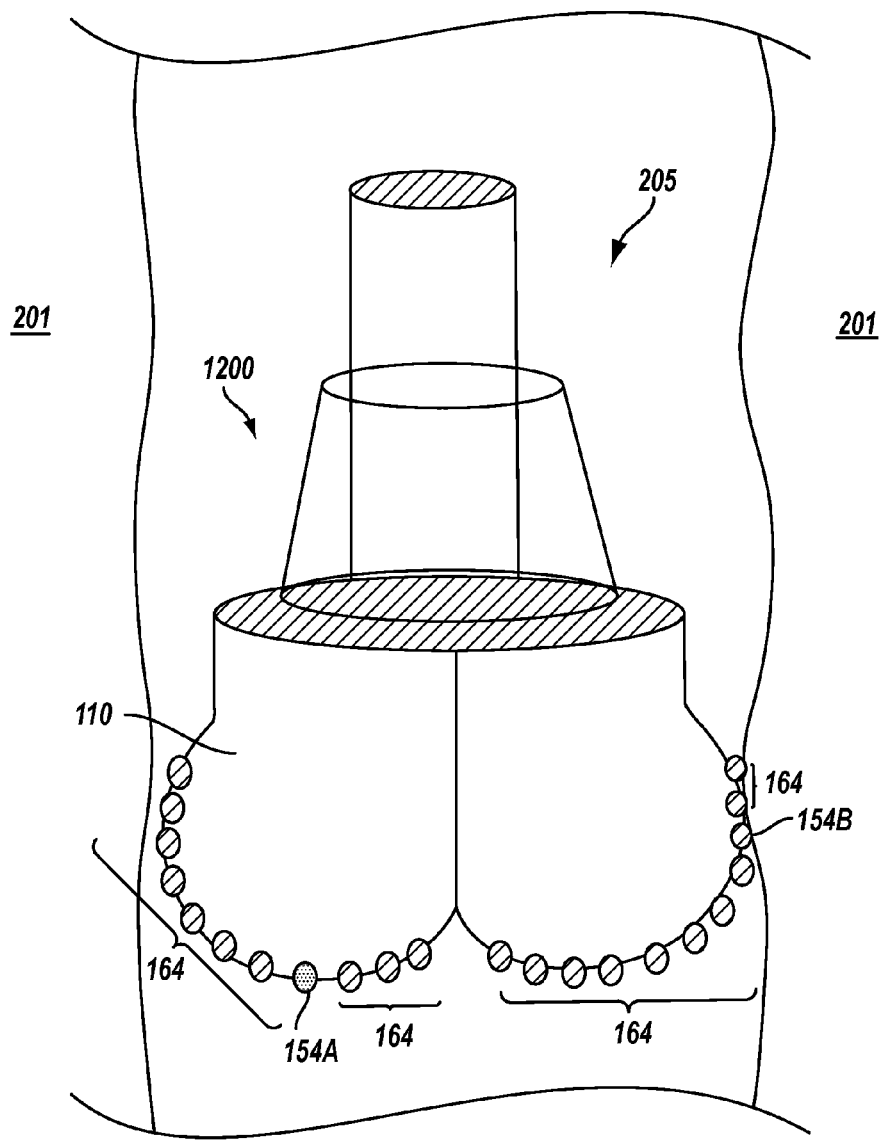
FIG. 12 is a simplified side view of an earth-boring drill bit according to an embodiment of the present disclosure.

FIG. 12 is a simplified side view of an earth-boring drill bit 1200 according to an embodiment of the present disclosure. In some embodiments, the instrumented cutting elements 154A, 154B may each include a plurality of electrodes such that each individual instrumented cutting element of the plurality of instrumented cutting elements 154A, 154B may measure resistivity. A first instrumented cutting element 154A may be located on the bit body 110 near the bottom of the earth-boring drill bit 1200, which may provide measurements to determine a horizontal resistivity (Rh). Horizontal resistivity (Rh) may be determined when a borehole trajectory is at right angles relative to the bedding. A second instrumented cutting element 154B may also be located on the bit body near a side of the earth-boring drill bit 1200, which may provide measurements to determine a vertical resistivity (Rv). Determining a horizontal resistivity (Rh) and a vertical resistivity (Rv) may be used to determine an anisotropy ratio (Rv/Rh). Resistivity anisotropy may be used to determine features about the subterranean formation 201. For example, shales exhibit relatively a high resistivity anisotropy ratio, while sands exhibit relatively low resistivity anisotropy ratio. Depending on the spacing of the instrumented cutting elements 154A, 154B used, microscopy (intrinsic anisotropy as found in shales and varved sediments) and macroscopic anisotropy arising from the layering of thin sands and shales may be estimated.

A borehole image may also be constructed using one or more instrumented cutting elements 154A, 154B (i.e., electrodes) and drill bit azimuth. The instrumented cutting elements 154A, 154B may be insulated from the bit body 110, which may result in an improved depth of investigation. Such a borehole image may be useful in real time for geosteering. In addition, the bit body 110 may include an orientation sensor (e.g., accelerometer) configured to determine the face orientation of the earth-boring drill bit 1200, or some other orientation measurement in order to orient the borehole image as well as the resistivity measurements.

The borehole image may also be useful for geologic description of the formation after drilling. In some embodiments, some of the data from the borehole image may be analyzed down-hole to minimize the amount of data needed to be transmitted in real time to the surface for geosteering, while more data may be saved in memory to construct a more detailed borehole image for geologic analysis after the earth-boring drill bit 1200 is retrieved. As a result of the instrumented cutting elements 154A, 154B, the risk for misaligned targets may be reduced, in addition to a reduction of information delay to the operator during drilling.

Due to squirt loss, the formation ahead of the earth-boring drill bit 1200 may be saturated with mud and mud filtrate (e.g., for the flushed zone a few mm ahead of the bit). As a result, resistivity measurements may further enable estimations of porosity. For example, porosity ($\phi$) may be determined by:

$$\phi = \sqrt{\frac{Rmf}{Rxo}} \tag{1}$$

where Rxo is the calibrated resistivity obtained from the instrumented cutting elements 154, and Rmf is a known mud filtrate resistivity. Equation (1) may assume some common Archie parameters: a=1, m=2 and n=2 and that the flushing in the rock immediately in contact with the instrumented cutting elements 154 is completely flushed of oil. The porosity ($\phi$) may be combined with other estimates (e.g., pore pressure), which may be used to predict serious over-pressure problems.

Figure 13:
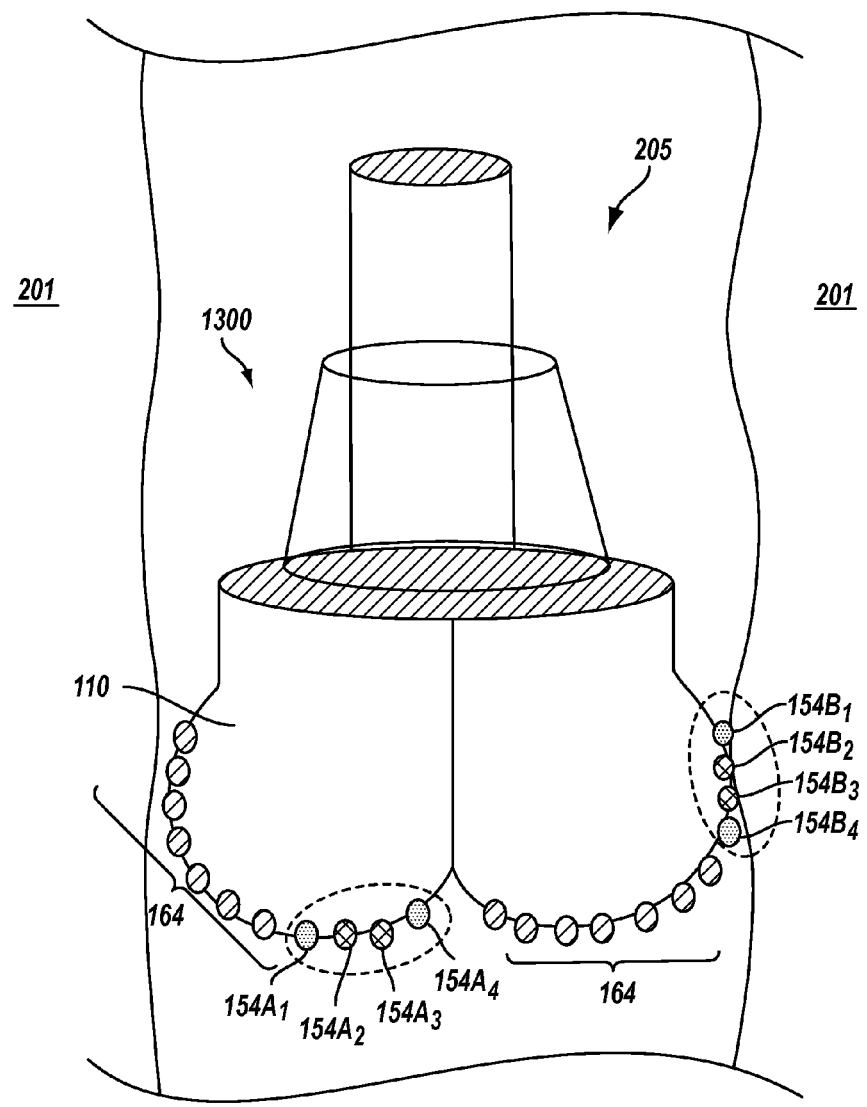
FIG. 13 is a simplified side view of an earth-boring drill bit according to an embodiment of the present disclosure.

FIG. 13 is a simplified side view of an earth-boring drill bit 1300 according to an embodiment of the present disclosure. The earth-boring drill bit 1300 may be inserted into a well bore hole 205 for engaging with a subterranean formation 201. As shown in FIG. 13, the earth-boring drill bit 1300 may include instrumented cutting elements $154A_{1-4}$, $154B_{1-4}$ arranged in groups. The earth-boring drill bit 1300 may further include a plurality of non-instrumented cutting elements 164, which may be simple cutting elements that are not instrumented with the sensors described herein. Thus, the earth-boring drill bit 1300 may include as a plurality of instrumented cutting elements $154A_{1-4}$, $154B_{1-4}$ that are instrumented and configured according to one or more of the embodiments described herein, as well as non-instrumented cutting elements 164.

In some embodiments, the instrumented cutting elements $154A_{1-4}$, $154B_{1-4}$ may each include a single electrode such that the group of instrumented cutting elements (e.g., instrumented cutting elements $154A_{1-4}$ or instrumented cutting elements $154B_{1-4}$) operate together as a multiple terminal electrode. For example, within a first group, a first instrumented cutting element $154A_1$ and a fourth instrumented cutting element $154A_4$ may form a circuit as a pair of current electrodes, and a second instrumented cutting element $154A_2$ and a third instrumented cutting element $154A_3$ may form a circuit as a pair of current electrodes. Similarly, within a second group, a first instrumented cutting element $154B_1$ and a fourth instrumented cutting element $154B_4$ may form a circuit as a pair of current electrodes, and a second instrumented cutting element $154B_2$ and a third instrumented cutting element $154B_3$ may form a circuit as a pair of current electrodes. Of course, other voltage and/or current electrode combinations are contemplated.

As a result, the four instrumented cutting elements $154A_{1-4}$ may be grouped together at the bottom (e.g., arranged on at least one of a nose and cone of the bit body 110) of the earth-boring drill bit 1300, and may operate to measure a voltage and/or a current and determine a horizontal resistivity ($R_{horizontal}$) for the subterranean formation 201. For example, two instrumented cutting elements may be used to measure current, while the other two instrumented cutting elements may be used to measure voltage. The four instrumented cutting elements $154B_{1-4}$ grouped together at a side (e.g., arranged on at least one of a gage and shoulder of the bit body 110) of the earth-boring drill bit 1300 may operate to measure a voltage and/or a current and determine a vertical resistivity ($R_{vertical}$) for the subterranean formation 201. For example, two instrumented cutting elements may be used to measure current, while the other two instrumented cutting elements may be used to measure voltage.

Figure 14:
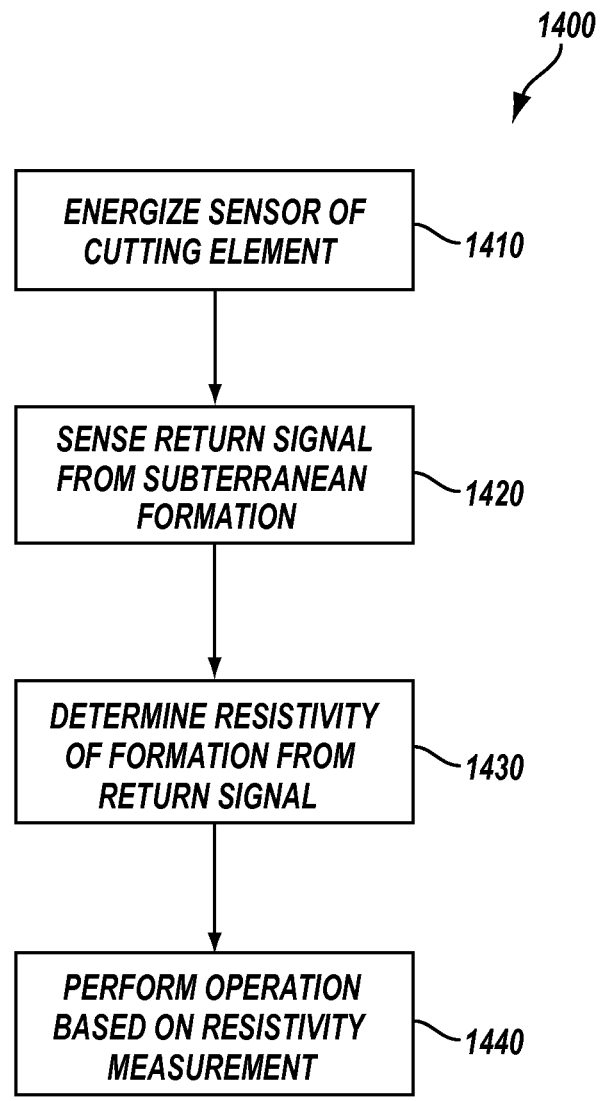
FIG. 14 is a flowchart illustrating a method for operating instrumented cutting elements to determine resistivity of a subterranean formation.

FIG. 14 is a flowchart 1400 illustrating a method for operating instrumented cutting elements to determine resistivity of a subterranean formation 201. At operation 1410, the sensor 216 of an instrumented cutting element 154 may be energized during a drilling operation. The sensor 216 may be energized by a voltage source or a current source from control circuitry 130 associated with the drill bit. As a result, a current may flow through the subterranean formation 201. At operation 1420, the return signal (e.g., voltage and/or current) may be sensed from the subterranean formation 201. At operation 1430, the resistivity of the subterranean formation 201 may be determined based on the return signal. At operation 1440, an operation may be performed based on the resistivity measurement. For example, the resistivity measurement may be used to make decisions for geosteering the drill bit during operation. In some embodiments, an image of the subterranean formation 201 may be generated (e.g., in real-time during drilling or at a later time). In some situations, the information received regarding the resistivity measurements may make it desirable to stop drilling operations for a period of time, among other actions that may be initiated based on the results from the resistivity measurements.

Additional non-limiting embodiments include:

Embodiment 1: A cutting element for an earth-boring drilling tool, the cutting element comprising: a cutting element body having a cutting surface thereon; and at least one sensor located proximate the cutting surface, the at least one sensor oriented and configured to determine resistivity of a contacting formation.

Embodiment 2: The cutting element of Embodiment 1, wherein the at least one sensor includes a plurality of electrodes coupled with a control circuit.

Embodiment 3: The cutting element of Embodiment 2, wherein the plurality of electrodes includes two terminals configured as voltage electrodes, and two terminals configured as current electrodes.

Embodiment 4: The cutting element of Embodiment 2 or Embodiment 3, wherein the plurality of electrodes includes an outer electrode extending around an inner electrode.

Embodiment 5: The cutting element of Embodiment 4, wherein the outer electrode has a ring shape.

Embodiment 6: The cutting element of Embodiment 5, wherein the sensor and at least a portion of the cutting surface are not coplanar.

Embodiment 7: The cutting element of Embodiment 6, wherein an outer periphery of the cutting surface protrudes beyond the outer electrode in a direction orthogonal to the substrate.

Embodiment 8: The cutting element of Embodiment 6 or Embodiment 7, wherein an inner region of the cutting surface between the outer electrode and the inner electrode is a recessed region.

Embodiment 9: An earth-boring drilling tool, comprising: a bit body; and an instrumented cutting element coupled with the bit body, the cutting element including a substrate with a cutting surface thereon, and at least one sensor located proximate the cutting surface, wherein the at least one sensor is oriented and configured to determine resistivity of a contacting formation.

Embodiment 10: The earth-boring drilling tool of Embodiment 9, further comprising a control circuit operably coupled with the at least one sensor, the control circuit configured to energize the at least one sensor and detect a return signal from the at least one sensor.

Embodiment 11: The earth-boring drilling tool of Embodiment 10, wherein the instrumented cutting element includes a diamond table disposed on a substrate, and wherein a conduit passes through the diamond table and the substrate coupling the at least one sensor to the control circuit.

Embodiment 12: The earth-boring drilling tool of Embodiment 11, wherein the bit body includes: a pocket in which the instrumented cutting element is disposed; and wiring passing through the pocket coupling the instrumented cutting element and the control circuit.

Embodiment 13: The earth-boring drilling tool of any of Embodiments 9 through 12, further comprising at least one non-instrumented cutting element coupled with the bit body.

Embodiment 14: The earth-boring drilling tool of any of Embodiments 9 through 13, wherein the at least one sensor includes a plurality of electrodes configured to sense at least one of a voltage and a current.

Embodiment 15: The earth-boring drilling tool of any of Embodiments 9 through 14, further comprising a plurality of instrumented cutting elements, each of the instrumented cutting elements configured as a single terminal device.

Embodiment 16: The earth-boring drilling tool of Embodiment 15, wherein the instrumented cutting elements of the plurality is grouped such that a first group of instrumented cutting elements are arranged on at least one of a gage and shoulder of the bit body, and a second group of instrumented cutting elements are arranged on at least one of a nose and cone of the bit body.

Embodiment 17: The earth-boring drilling tool of Embodiment 15, wherein at least two single terminal devices form a circuit with the control circuitry.

Embodiment 18: The earth-boring drilling tool of Embodiment 10, further comprising another instrumented cutting element coupled with the drill bit at a location that actively engages the subterranean formation if the drilling operation is in a dragging mode or rubbing mode.

Embodiment 19: A method of determining resistivity of a subterranean formation during a drilling operation, the method comprising: energizing a sensor of an instrumented cutting element of a drill bit; sensing a return signal flowing on or through the subterranean formation; and determining a resistivity of the subterranean formation based, at least in part, on the return signal.

Embodiment 20: The method of Embodiment 19, wherein energizing the sensor includes at least one of applying a voltage to the sensor and injecting a current into the subterranean formation through the sensor, and sensing the return signal occurs through the sensor of the instrumented cutting element.

Embodiment 21: The method of Embodiment 19, wherein energizing the sensor and sensing the return signal includes generating current flowing between the instrumented cutting element and another instrumented cutting element.

Embodiment 22: The method of Embodiment 19, wherein generating current flowing between the instrumented cutting element and another instrumented cutting element includes generating current flowing between the instrumented cutting element and the another instrumented cutting element positioned at a location on one of a drill string and a surface of the subterranean formation.

Embodiment 23: The method of any of Embodiments 19 through 22, wherein determining a resistivity of the subterranean formation includes determining a horizontal resistivity and a vertical resistivity of the subterranean formation.

Embodiment 24: The method of Embodiment 23, further comprising determining porosity of the subterranean formation using the determined horizontal resistivity and vertical resistivity.

Although the foregoing description contains many specifics, these are not to be construed as limiting the scope of the present disclosure, but merely as providing certain exemplary embodiments. Similarly, other embodiments of the disclosure may be devised which do not depart from the scope of the present disclosure. For example, features described herein with reference to one embodiment also may be provided in others of the embodiments described herein. The scope of the disclosure is, therefore, indicated and limited only by the appended claims and their legal equivalents, rather than by the foregoing description.

What is claimed is:

1. An earth-boring drilling tool, comprising:
   a bit body having at least one blade formed thereon; and
   a cutting element at least partially disposed within a pocket of the at least one blade of the bit body, the cutting element comprising:
      a cutting element body having a cutting surface thereon; and
      at least one sensor disposed within the cutting element body and having at least one exposed surface, the at least one exposed surface being recessed relative to at least a portion of the cutting surface of the cutting element, the at least one sensor oriented and configured to sense resistivity of one of a contacting formation and the cutting element.

2. The earth-boring drilling tool of claim 1, wherein the at least one sensor of the cutting element includes a plurality of electrodes coupled with a control circuit.

3. The earth-boring drilling tool of claim 2, wherein the plurality of electrodes includes two terminals configured to measure voltages, and two terminals configured to measure currents.

4. The earth-boring drilling tool of claim 2, wherein the plurality of electrodes includes an outer electrode extending around an inner electrode.

5. The earth-boring drilling tool of claim 4, wherein the outer electrode has a ring shape.

6. The earth-boring drilling tool of claim 1, wherein at least a portion of the cutting surface of the cutting element is recessed relative to the at least one exposed surface of the at least one sensor.

7. The earth-boring drilling tool of claim 5, wherein an outer periphery of the cutting surface protrudes beyond the outer electrode in a direction orthogonal to a plane including the ring shape.

8. The earth-boring drilling tool of claim 5, wherein an inner region of the cutting surface between the outer electrode and the inner electrode is recessed relative to the outer electrode and the inner electrode.

9. An earth-boring drilling tool, comprising:
   a bit body; and
   an instrumented cutting element coupled with the bit body, the cutting element including:
     a substrate;
     a cutting body disposed on the substrate and having a cutting surface, thereon;
     at least one sensor disposed within the cutting body, at least one surface of the at least one sensor being at least substantially flush with the cutting surface of the cutting element, wherein the at least one sensor is oriented and configured to sense resistivity of one of a contacting formation and the instrumented cutting element; and
     at least one conduit coupled to the at least one sensor and extending through the cutting body and through the substrate in a direction at least substantially orthogonal to the cutting surface of the cutting body of the cutting element.

10. The earth-boring drilling tool of claim 9, further comprising a control circuit operably coupled with the at least one sensor via the at least one conduit, the control circuit configured to energize the at least one sensor through the at least one conduit and detect a return signal from the at least one sensor through the at least one conduit.

11. The earth-boring drilling tool of claim 10, wherein the cutting body includes a diamond table.

12. The earth-boring drilling tool of claim 11, wherein the bit body includes:
   a pocket in which the instrumented cutting element is at least partially disposed; and
   wiring passing through the pocket coupling the at least one conduit of the instrumented cutting element to the control circuit.

13. The earth-boring drilling tool of claim 10, further comprising at least one non-instrumented cutting element coupled with the bit body.

14. The earth-boring drilling tool of claim 10, wherein the at least one sensor includes a plurality of electrodes configured to sense at least one of a voltage and a current.

15. The earth-boring drilling tool of claim 10, further comprising a plurality of instrumented cutting elements, each of the instrumented cutting elements including a single terminal of a circuit.

16. The earth-boring drilling tool of claim 15, wherein the instrumented cutting elements of the plurality are grouped such that a first group of instrumented cutting elements are arranged on at least one of a gage and shoulder of the bit body, and a second group of instrumented cutting elements are arranged on at least one of a nose and cone of the bit body.

17. The earth-boring drilling tool of claim 15, wherein at least two single terminal devices form the circuit with the control circuitry.

18. The earth-boring drilling tool of claim 10, further comprising another instrumented cutting element coupled with the drill bit at a location that actively engages the subterranean formation if the drilling operation is in a dragging mode or rubbing mode.

19. A method of determining resistivity of a subterranean formation during a drilling operation, the method comprising:
   contacting a sensor disposed within a cutting body of a cutting element at least partially disposed within a pocket of a blade of a body of an earth-boring drilling tool with the subterranean formation, an exposed surface of the sensor being recessed relative to at least a portion of a cutting surface of the cutting element;
   energizing the sensor of the cutting element while the sensor is in contact with the subterranean formation;
   sensing a return signal flowing on or through the subterranean formation; and
   determining a resistivity of the subterranean formation based, at least in part, on the return signal.

20. The method of claim 19, wherein energizing the sensor comprises applying a current into the subterranean formation through the sensor using a voltage source of a current source, and wherein sensing the return signal occurs through the sensor of the instrumented cutting element.

21. The method of claim 19, wherein energizing the sensor and sensing the return signal includes generating current flowing between the instrumented cutting element and another instrumented cutting element.

22. The method of claim 21, wherein generating current flowing between the instrumented cutting element and another instrumented cutting element includes generating current flowing between the sensor of the instrumented cutting element and another sensor of the another instrumented cutting element.

23. The method of claim 19, wherein determining a resistivity of the subterranean formation includes determining a horizontal resistivity and a vertical resistivity of the subterranean formation.

24. The method of claim 23, further comprising determining porosity of the subterranean formation using the determined horizontal resistivity and vertical resistivity.

* * * * *